United States Patent
Smit

(10) Patent No.: US 12,241,658 B2
(45) Date of Patent: Mar. 4, 2025

(54) HELIOSTAT CALIBRATION

(71) Applicant: Stellenbosch University, Stellenbosch (ZA)

(72) Inventor: Willem Jacobus Smit, Stellenbosch (ZA)

(73) Assignee: Stellenbosch University, Stellenbosch (ZA)

( * ) Notice: Subject to any disclaimer, the term of this patent is extended or adjusted under 35 U.S.C. 154(b) by 28 days.

(21) Appl. No.: 18/028,888

(22) PCT Filed: Oct. 1, 2021

(86) PCT No.: PCT/IB2021/059037
§ 371 (c)(1),
(2) Date: Mar. 28, 2023

(87) PCT Pub. No.: WO2022/070153
PCT Pub. Date: Apr. 7, 2022

(65) Prior Publication Data
US 2023/0341151 A1 Oct. 26, 2023

(30) Foreign Application Priority Data
Oct. 1, 2020 (ZA) .................. 2020/06085

(51) Int. Cl.
*F24S 50/20* (2018.01)
*F24S 23/70* (2018.01)
(Continued)

(52) U.S. Cl.
CPC ............... *F24S 50/20* (2018.05); *G06T 7/13* (2017.01); *G06T 7/60* (2013.01); *G06T 7/73* (2017.01);
(Continued)

(58) Field of Classification Search
None
See application file for complete search history.

(56) References Cited

U.S. PATENT DOCUMENTS 8,674,280 B1   3/2014   Andraka
9,523,759 B2   12/2016  Idealab
(Continued)

FOREIGN PATENT DOCUMENTS

CN       108413987 A  *  8/2018  ............ G01C 25/00
DE     10-2015-217-086        3/2017
(Continued)

OTHER PUBLICATIONS

Sattler et al., "Review of heliostat calibration and tracking control methods," Elsevier, Solar Energy, vol. 207, Sep. 1, 2020, pp. 110-132. (Year: 2020).*
(Continued)

*Primary Examiner* — Hung Q Dang
(74) *Attorney, Agent, or Firm* — Remenick PLLC

(57) ABSTRACT

Systems and methods for calibrating a heliostat (104) are disclosed. An imaging device (100) is positioned and oriented so that a calibration target (130) reflected by the heliostat (103) is visible at the imaging device and an image taken. Multiple features of the reflected calibration target in the image are identified and used to determine a centroid of reflection within the image which is then mapped to a corresponding centroid position on the calibration target. A vector $\bar{t}$ that extends between the centroid position on the calibration target and a known position of the heliostat, as well as a vectors that extends between the known positions of the imaging device and of the heliostat, are determined. A normal vector $\bar{n}$ of the heliostat is determined as the vector that bisects $\bar{s}$ and $\bar{t}$ and is used to calibrate the heliostat by updating parameters of a heliostat tracking model.

18 Claims, 5 Drawing Sheets

(51) Int. Cl.
*F24S 23/77* (2018.01)
*G06T 7/13* (2017.01)
*G06T 7/60* (2017.01)
*G06T 7/73* (2017.01)

(52) U.S. Cl.
CPC ............ *F24S 23/77* (2018.05); *F24S 2050/25* (2018.05); *G06T 2207/10024* (2013.01); *G06T 2207/10032* (2013.01)

(56) References Cited

U.S. PATENT DOCUMENTS

| | | | | |
|---|---|---|---|---|
| 11,017,561 B1* | 5/2021 | Sonn | ......................... | G06T 7/70 |
| 2009/0107485 A1* | 4/2009 | Reznik | .................... | F24S 20/20 |
| | | | | 126/600 |
| 2010/0031952 A1* | 2/2010 | Zavodny | ................. | F24S 23/70 |
| | | | | 126/573 |
| 2011/0000478 A1* | 1/2011 | Reznik | .................... | F24S 50/20 |
| | | | | 126/576 |
| 2013/0139804 A1* | 6/2013 | Goldberg | ................ | F24S 50/20 |
| | | | | 126/714 |
| 2016/0025591 A1 | 1/2016 | Risner et al. | | |
| 2021/0110571 A1* | 4/2021 | Zhu | ........................... | G06T 7/60 |

FOREIGN PATENT DOCUMENTS

| | | | | |
|---|---|---|---|---|
| DE | 102015217086 A1 * | 3/2017 | ............. | F24S 23/77 |
| WO | WO 2012/083383 | 6/2012 | | |

OTHER PUBLICATIONS

Ayres et al., "Heliostat aiming corrections with bad data detection," Research Article, Dec. 11, 2020 (Year: 2000).*

Farrell et al, "A non-intrusive optical approach to characterize heliostats in utility-scale power tower plants: Flight path generation/optimization of unmanned aerial systems," Elsevier, Solar Energy, vol. 225, Sep. 1, 2021, pp. 784-801. (Year: 2021).*

Search Report for Application No. PCT/IB2021/059037—dated Dec. 2, 2021.

Written Opinion for Application No. PCT/IB2021/059037—dated Dec. 2, 2021.

* cited by examiner

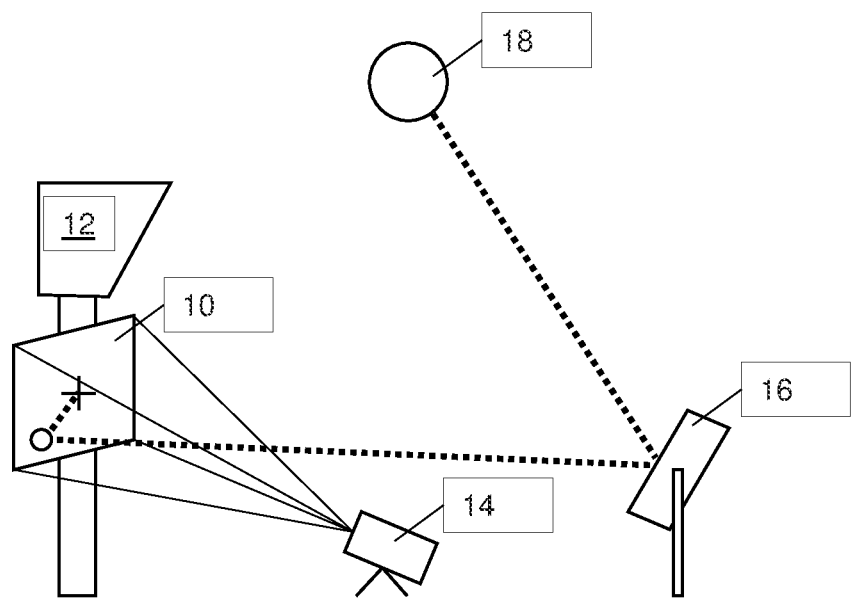
FIGURE 1 – PRIOR ART
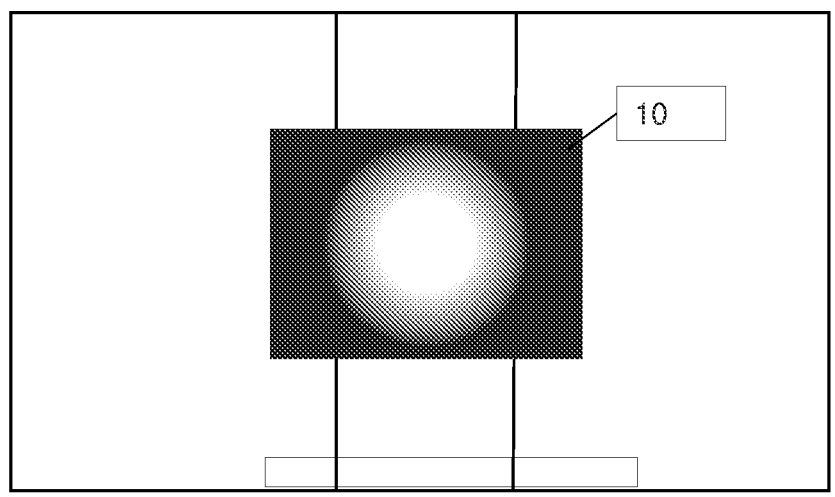
FIGURE 2 – PRIOR ART

HELIOSTAT CALIBRATION

CROSS-REFERENCE TO RELATED APPLICATIONS

This application is a National Stage Application of PCT Application No. PCT/IB2021/059037 filed 1 Oct. 2021, which claims priority from South African provisional patent application number 2020/06085 filed on 1 Oct. 2020, both of which are incorporated by reference herein.

FIELD OF THE INVENTION

This invention relates to heliostat calibration.

BACKGROUND TO THE INVENTION

A heliostat is a sun tracking mirror on a dual axis system that reflects sunlight onto a fixed spot. Multiple heliostats can concentrate sunlight onto a single target, such as a thermal receiver of a concentrated solar power (CSP) plant. A CSP plant consists of a field of heliostats that reflect sunlight onto a receiver housed atop a tower. The receiver heats a working fluid, which may be used to drive a turbine to produce electricity or may be used as a source of process heat, such as to heat manganese ore before it enters a smelter.

The exact azimuth and elevation angles of the sun are known at any specific moment in time in a given geographic location, and the heliostat tracking system uses that information to adjust its actuators in such a manner that the normal of the mirror plane bisects the angle between the sun and the target.

Each heliostat typically has open-loop control. This means that the heliostat does not receive feedback on the go while operating, since the light reflected by one heliostat cannot be distinguished from the light reflected by hundreds of others as they are all focusing on the same receiver. For this reason a heliostat needs to be calibrated frequently to maintain a reasonable tracking accuracy and ensure that as much light as possible is focused on the target receiver.

The most common currently used means of heliostat calibration is with the beam characterization system (BCS). With this system, a white calibration target is provided, typically a few meters below the thermal receiver on the tower, as well as a camera at a known position. A heliostat control system is instructed to move down from the receiver to the calibration target. With the help of the camera, the exact spot can be determined where the heliostat's beam is reflecting. If the reflected beam is not on the expected spot, the parameters of the heliostat tracking model are updated accordingly. This equates to one calibration point.

The calibration target is not designed to withstand more than a few heliostats reflecting on it at one time. It may take about 2 minutes per calibration point per heliostat. This equates to 10,000 minutes, or 170 hours, of calibration time for a field of 5,000 heliostats. With only about 8 hours of calibration time per day, this means that 20-21 days can be spent to get a single calibration point for all the heliostats in the field. Ideally, to accurately determine the parameters of the heliostat tracking model, more than 20 calibration points are desired. This then equates to a calibration time of 416 days, well over a year, to fully calibrate such a field of heliostats.

Since heliostats cannot be calibrated often using the BCS system, their physical construction must be much larger and more rigid than would be the case if they could be calibrated more often. Since a cost of a heliostat field may represent in the order of a third of the cost of a CSP plant, a reduction in the cost of the heliostats would be advantageous.

While other methods for calibrating heliostats have been proposed, such as using lasers, erecting more targets, placing cameras on the heliostats themselves, or even using aerial vehicles, these may not have been sufficiently accurate due to, among other issues, problems in accurately determining the relevant vectors from reflected images. Difficulties also exist in finding the orientation of the heliostat and correlating that to relevant actuator values.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a method of calibrating a heliostat, comprising:
positioning and orienting an imaging device so that a calibration target reflected by the heliostat is visible at the imaging device, the imaging device having a known position;
by means of the imaging device, taking an image of the heliostat that includes the reflected calibration target visible on the heliostat;
identifying multiple features of the reflected calibration target in the image;
using the multiple features to determine a centroid of reflection within the image;
mapping the centroid of reflection within the image to a corresponding centroid position on the calibration target;
determining a vector $\bar{t}$ that extends between the centroid position on the calibration target and a known position of the heliostat;
determining a vector $\bar{s}$ that extends between the known position of the imaging device and the known position of the heliostat;
determining a normal vector $\bar{n}$ of the heliostat as the vector that bisects the $\bar{t}$-vector and the $\bar{s}$-vector; and
calibrating the heliostat by updating parameters of a tracking model using the determined $\bar{n}$-vector.

In one embodiment, the calibration target is divided into a number of segments, each segment representing one of the features that is identified. The segments may have a visual coding applied thereto so a sub-set of segments can be uniquely identified within all of the segments. The visual coding may include colours applied to at least a portion of each segment. In this embodiment, only a sub-set of the segments may be visible within the image.

Determining a centroid of reflection within the image may include determining a weighted average of areas of the segments shown within the image. An area of a segment shown in the image may be determined based on a number of pixels in the image within the segment.

In a second embodiment, an existing calibration target may be used which may not be divided into segments. In this embodiment, the method may include:
determining coordinates of a point (A) in the image that corresponds to a centre of the heliostat;
determining coordinates of the identified features (h1, h2, h3, h4) of the reflected calibration target in the image;

determining a projective transformation matrix (H) that transforms the features (h1, h2, h3, h4) to actual coordinates of the corresponding features on the calibration target;

applying the projective transformation matrix (H) to the centre point (A) so as to determine coordinates of a point (B) on the target corresponding to the centre point (A), the point (B) being designated as the centroid position on the calibration target.

In the second embodiment, the step of determining the coordinates of the centre point (A) may include analysing the image to identify corners (p1, p2, p3, p4) of the heliostat, and calculating the centre point (A) as the point at which lines connecting the corners intersect. Further according to the second embodiment, the identified features (h1, h2, h3, h4) of the reflected calibration target may be four corners of the reflected calibration target.

The imaging device may be mounted on an aerial vehicle such as a drone, or the imaging device may be mounted on a pole or pedestal supported on the ground.

The method may include an initial step of moving the heliostat into a calibration orientation.

The method may be repeated in respect of each image recorded by the imaging device, so as to rapidly obtain multiple $\bar{n}$-vectors for use in updating parameters of the tracking model.

The known position of the imaging device may be a position relative to the heliostat to which the sun does not move during the day. This makes it possible to define a heliostat tracking model more accurately and with calibration points that are not available when using the sun's reflection for calibration.

The imaging device's position may be determined by means of a real-time kinematic (RTK) global positioning system (GPS).

One imaging device may be capable of calibrating more than one heliostat from each known position by taking images of more than one heliostat.

The imaging device can be moved to successive known positions so as to successively obtain different calibration points.

More than one imaging device can be employed simultaneously over a field of heliostats.

The invention extends to a system for calibrating a heliostat, comprising:
  an imaging device;
  means to position and orient the imaging device so that a calibration target reflected by the heliostat is visible at the imaging device;
  a position detection system to determine the position of the imaging device; and
  a processor;
  wherein the imaging device takes an image of the heliostat that includes the reflected calibration target visible on the heliostat;
  and wherein the processor:
    identifies multiple features of the reflected calibration target in the image;
    uses the multiple features to determine a centroid of reflection within the image;
    maps the centroid of reflection within the image to a corresponding centroid position on the calibration target;
    determines a vector $\bar{t}$ that extends between the centroid position on the calibration target and a known position of the heliostat;
    determines a vector $\bar{s}$ that extends between the known position of the imaging device and the known position of the heliostat; and
    determines a normal vector $\bar{n}$ of the heliostat as the vector that bisects the $\bar{t}$-vector and the $\bar{s}$-vector, the $\bar{n}$-vector usable in calibrating the heliostat by updating parameters of a tracking model of the heliostat.

Embodiments of the invention will now be described, by way of example only, with reference to the accompanying drawings.

BRIEF DESCRIPTION OF THE DRAWINGS

In the drawings:

FIG. 1 is a schematic illustration of a prior art method of calibrating a heliostat;

FIG. 2 shows an image captured by a camera shown in FIG. 1;

DETAILED DESCRIPTION WITH REFERENCE TO THE DRAWINGS

Figure 3:
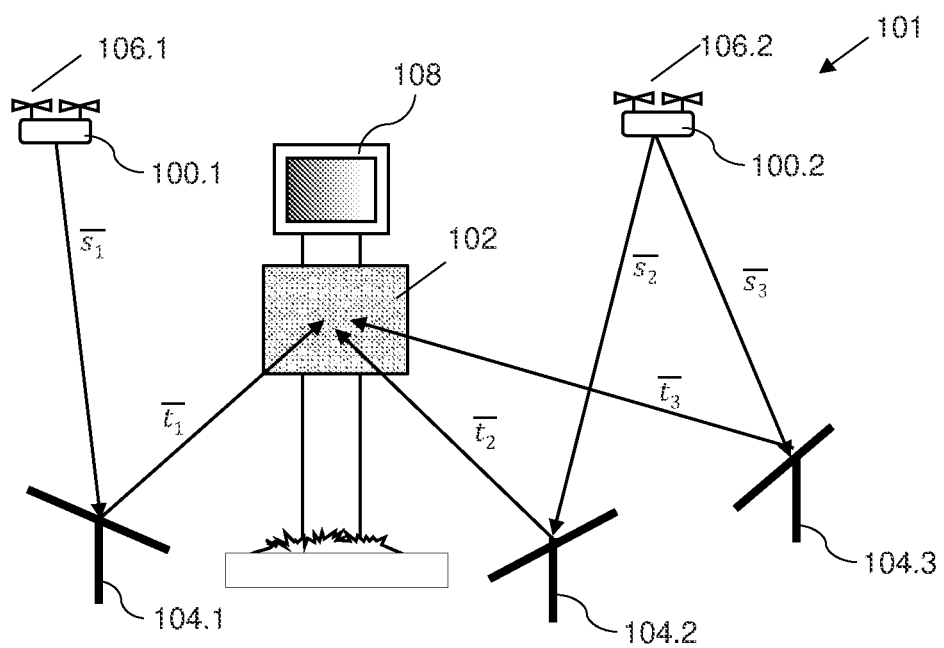
FIG. 3 is a schematic illustration of a first embodiment of a system for calibrating a heliostat according to the present disclosure.

Embodiments of the invention provide for systems and methods of calibrating a heliostat. An imaging device may be positioned and oriented so that a calibration target reflected by the heliostat is visible at the imaging device. The imaging device may have a known position. The imaging device may then take an image of the heliostat that includes the reflected calibration target visible on the heliostat. Multiple features of the reflected calibration target in the image may then be identified. These features may be used to determine a centroid of reflection within the image. The centroid of reflection may be mapped to a corresponding centroid position on the calibration target. A vector $\bar{t}$ may then be determined as the vector that extends between the centroid position on the calibration target and a known position of the heliostat. A vector $\bar{s}$ may then be determined as the vector that extends between the known position of the imaging device and the known position of the heliostat. A normal vector $\bar{n}$ of the heliostat may then be determined as the vector that bisects the $\bar{t}$-vector and the $\bar{s}$-vector. Finally, the heliostat may be calibrated by updating parameters of a tracking model using the determined $\bar{n}$-vector.

FIG. 1 shows a prior art method of calibrating a heliostat using the beam characterization system (BCS). In this method, a white calibration target (10) is provided, usually a few metres below a receiver (12) on a tower, and a charge coupled device (CCD) camera (14) is directed at the calibration target (10). A heliostat (16) being calibrated is moved so that light from the sun (18) is to be reflected onto a desired known position, being the centre of the calibration target (10). The CCD camera (14) is able to determine the exact spot where the heliostat's beam is reflecting. If the reflected beam is not on the desired spot, the parameters of the heliostat tracking model are updated accordingly. This then corresponds to one calibration point. Other calibration points can be obtained at different times when the sun (18) is at different angles. FIG. 2 shows an example of the calibration target (10) of FIG. 1, where the reflected beam from the heliostat is the centre of the calibration target (10).

FIG. 3 is a schematic diagram illustrating a system (101) for calibrating a heliostat according to a first exemplary embodiment of the present disclosure. In this system, the sun is not used as a point of reference for calibration. Instead, one or more imaging devices (100) are utilized. In this illustration, two imaging devices (100.1, 100.2) are shown. An imaging device (100) may be capable of moving its position and being oriented through suitable means. In the illustrated embodiment, that means is a drone on which the imaging device (100) is mounted. The drone (106) may be a multi-copter drone that can hover at a stationary position. In this illustration two drones (106.1, 106.2) are shown, each supporting its corresponding imaging device (100.1, 100.2) but there could be only one or any number of desired drones. In a different embodiment (not illustrated), the imaging device (100) may be mounted on a pole or pedestal supported on the ground. The pole or pedestal may be capable of being moved by hand or by means of a movable platform or buggy onto which the pole or pedestal is mounted.

Each imaging device (100) moves above a field of heliostats (104.1, 104.2, 104.3) that operate by reflecting sunlight onto a central thermal receiver (108) where a working fluid may be heated which may be used to drive a turbine to produce electricity or may be used as a source of process heat, such as to heat manganese ore before it enters a smelter. The schematic shows only three heliostats (104.1, 104.2, 104.3), but it will be appreciated that in a typical concentrated solar power (CSP) plant there could be thousands of heliostats.

To properly calibrate a heliostat, it is necessary to measure its normal vector (which is the vector $\bar{n}$ extending normally from the centre of the heliostat mirror) when the heliostat is in a number of different positions. A first optional step in calibrating a heliostat is to move the heliostat into a calibration orientation by means of an existing heliostat control system. This step is optional because embodiments exist in which the heliostat can be calibrated while it is operational and focusing the sun's rays onto the central receiver. Moving the heliostat into a calibration orientation may, however, have the advantage that calibration positions can be obtained which are outside the normal positions into which the heliostat moves when tracking the sun, which may increase the accuracy of calibration.

The imaging device (100) may be positioned and oriented so that a calibration target (102) reflected by a heliostat (104) is visible at the imaging device (100). The imaging device (100) has a known three-dimensional position. Its position may be determined by a position detecting system, for example by means of a Global Positioning System (GPS) or by means of photogrammetry in which multiple recognized features enable triangulation to be performed. In the case of a GPS being used, typical onboard GPS devices provided in association with aerial vehicles such as drones may not be accurate enough, so in some embodiments the aerial vehicle may be provided with a real-time kinematic (RTK) GPS system, in which a fixed base station wirelessly sends out corrections to the onboard GPS system to provide centimetre-level positioning accuracy.

FIG. 3 illustrates how one heliostat (104.1) reflects the calibration target (102) towards a first imaging device (100.1) while two other heliostats (104.2 and 104.3) reflect the calibration target (102) towards the same second imaging device (100.2). It will become apparent in what follows that a single imaging device can accordingly be used to calibrate one or more heliostats.

The imaging device, such as an onboard camera on the drone, then takes an image (110) of the heliostat that includes at least a portion of the calibration target (102) visible on the heliostat mirror. Such an image (110) taken by an imaging device is shown in FIG. 4.

Figure 4:
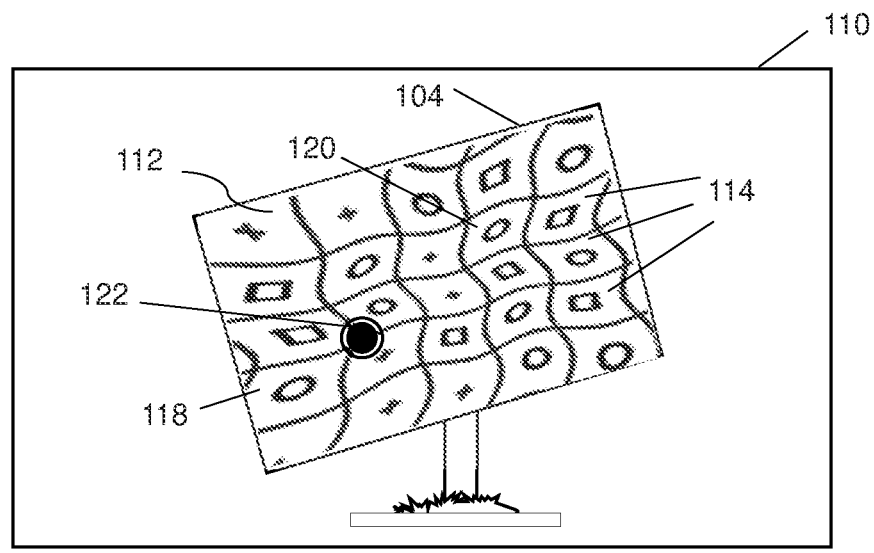
FIG. 4 shows an image captured by an imaging device shown in FIG. 3.

Referring to FIGS. 3 and 4, the vectors between the imaging device (100) and the centre of the heliostat (104) is known since the position of both the imaging device (100) and the centre of the heliostat (104) are known. What is required to be able to calibrate the heliostat (104), however, is the vector $\bar{t}$ between the centre of the heliostat (104) the centre of reflection on the calibration target (102), because from the $\bar{t}$-vector and the $\bar{s}$-vector the normal vector $\bar{n}$ of the heliostat (104) can be derived as will be explained below.

To determine the $\bar{t}$-vector it is necessary to derive the point on the calibration target (102) at which the mirror is directed from the obtained image (110). According to embodiments of the invention, multiple features of the reflected calibration target may be identified in the image (110). These multiple features may be used to determine a centroid of reflection within the image (110). The centroid of reflection within the image (110) may then be mapped to a corresponding centroid position on the calibration target (102). The $\bar{t}$-vector may then be determined that extends between the known position on the heliostat (104) and the centroid position on the calibration target (102). The normal vector $\bar{n}$ of the heliostat (104) may then be determined as the vector that bisects the $\bar{n}$-vector and the $\bar{s}$-vector, and the heliostat (104) may be calibrated by updating parameters of a tracking model of the heliostat using the determined $\bar{n}$-vector. Each calibration reading consists of data of the heliostat's actuator positions (azimuth and elevation) and the determined $\bar{n}$-vector which is the direction in which light is reflected off the heliostat. By obtaining multiple calibration readings, the tracking model of the heliostat can be updated more accurately. These steps will be explained in greater detail in what follows. It will also be appreciated that these steps are carried out by a suitable processor, which may be a processor associated with the imaging device (e.g. onboard the aerial vehicle) or a processor remote from the imaging device in which case the imaging device may transmit its images for receipt by the processor. The processor may be capable of executing computer-readable program code and may have an associated memory for storing the computer-readable program code. The processor may therefore be a computing device.

Figure 5:
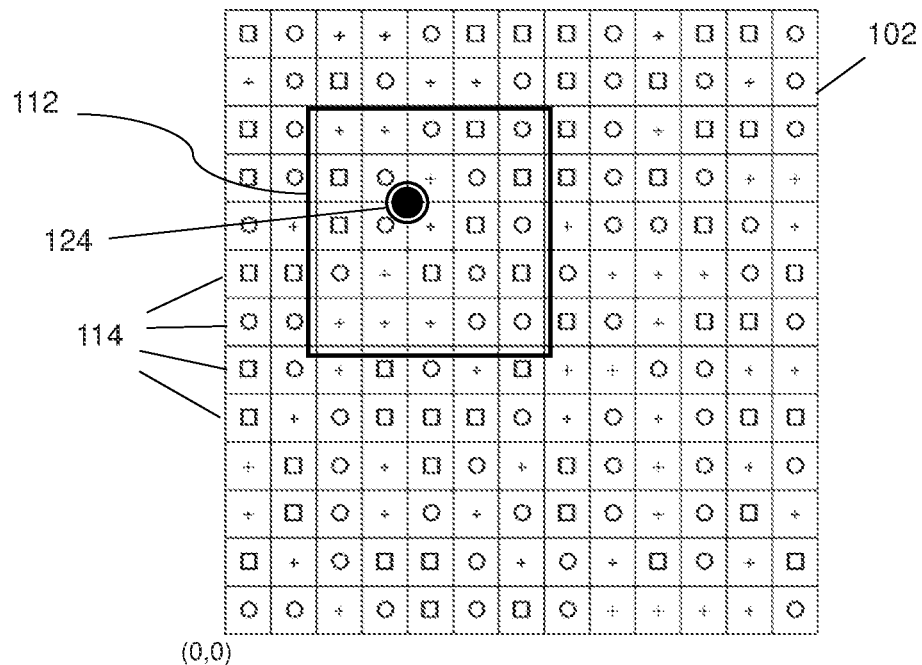
FIG. 5 shows a detail view of an exemplary calibration target of FIG. 3.
Figure 6:
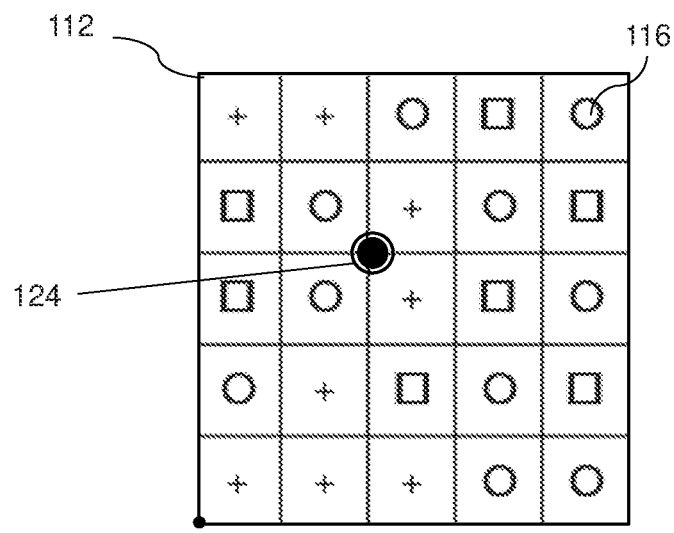
FIG. 6 shows a portion of the calibration target of FIG. 5.

FIG. 5 shows the calibration target (102) in greater detail, and FIG. 6 shows a portion (112) of the calibration target which corresponds to the same reflected portion (112) shown in FIG. 4. It will be appreciated that the reflected portion (112) shown in the photograph of FIG. 4 is distorted due to imperfections in the surface of the heliostat mirror.

In the embodiment shown in FIGS. 3 to 6, the calibration target (102) is divided into a number of segments (114). Each segment (114) represents a feature which is able to be identified in the reflected image (110). In this illustration, the segments (114) are formed by the calibration target (102) being divided into a number of rows and columns, and a visual coding (116) may be applied thereto. The visual coding (116) may include particular visual markings applied to each segment or may in certain embodiments include colours applied to at least a portion of each segment. For ease of illustration, in this example the visual coding (116) includes three different markings shown as squares, circles and crosses which have been applied to the segments (114), but in one embodiment the visual coding (116) may be colour applied to all or a portion of at least some of the segments, e.g. coloured dots such as red, green and blue dots An advantage of using colour may be that distortion of the colour dots may not impact the ability to easily recognise their wavelength, since the imaging device (100) is colour-sensitive. The coding system may also include other features such as chess-board type blocks of black and white with the colour dots only in white blocks, or many other possible visual coding options. Each segment (114) could even have a unique code, such as a two-dimensional code, in some embodiments.

The visual coding system is designed such that a sub-set of segments can be uniquely identified within all of the segments, so that if only a sub-set of segments are visible within the image, the position of that sub-set within the entire calibration target is known. The visual coding system such as the illustrated system may be determined by an iterative method using only three different colours (represented here by the square, circle and cross symbols) and a constraint that every 3 by 3 group of segments should be unique, so that if any 3 by 3 group of segments are visible in the image their position within the calibration target is known. Many other visual coding systems can of course be obtained with different requirements and constraints.

Referring back to FIG. 4, the multiple features (in this case the visually-coded segments (114)) are used to identify a centroid of reflection (122) within the image. Determining the centroid of reflection (122) within the image may include determining a weighted average of displayed areas of the segments (114) shown within the image. This is because a large segment (e.g. 118) reflects more light than a smaller segment (e.g. 120) and must therefore be weighted more to determine the centroid of reflection (122) within the image. The centroid of reflection (122) is then mapped to a corresponding centroid (124) position on the actual calibration target as seen in FIG. 5, using the coding (116) which identifies the position of the portion (112) within the calibration target.

Each segment (114) has an x and y position on the calibration target the correspond to a measurement of the centre of that segment from a starting coordinate, such as a (0, 0) coordinate at the bottom left of the calibration target. For example, if as illustrated in FIG. 5, the calibration target has 13 columns and 13 rows, and we assume that the calibration target is 10 m wide and 10 m high, then the coordinate of the segment at the very centre of the calibration target is at (5,5) and the coordinates of each other segment are known. Each segment is also given a unique number, in this case beginning with 1 at the bottom left and ending with 169 (13×13) at the top right.

Determining the x-coordinate of the centroid (124) can then be calculated by the following formula:

$$x = \frac{1}{\sum_i I_i}\left(\sum_i I_i \cdot x_i\right) \quad (1)$$

where i is the segment number, $x_i$ is the x-coordinate of segment i and $I_i$ is the number of pixels measured within segment i in the image (110), thereby also corresponding to the area of that segment in the image (110). The symbol I is used because the number of pixels represents intensity of light. $I_i$ is thus equivalent to an amount of light that would have fallen onto segment i if the imaging device had been the sun.

The y-coordinate of the centroid (124) can be calculated by the same formula applied to the y-coordinates of the segments:

$$y = \frac{1}{\sum_i I_i}\left(\sum_i I_i \cdot y_i\right) \quad (2)$$

Since the (x,y) coordinates of the centroid (124) are now determined, the $\bar{t}$-vector may then be determined that extends between the known position of the heliostat and the centroid position (x,y) on the calibration target.

From the $\bar{s}$-vector and the derived $\bar{t}$-vector, a normal vector $\bar{n}$ of the heliostat can be derived. The $\bar{n}$-vector is the vector that bisects the $\bar{t}$-vector and the $\bar{s}$-vector and is determined using the following equation:

$$\bar{n} = \frac{\bar{t}}{\|\bar{t}\|} - \frac{\bar{s}}{\|\bar{s}\|} \quad (3)$$

The H-vector is then used to calibrate the heliostat by updating parameters of a tracking model of the heliostat according to existing methods.

This method is then repeated with the heliostat moved to a different calibration position as to obtain multiple $\bar{n}$-vectors for use in updating parameters of the tracking model.

An aerial vehicle like a drone can rapidly be flown into different positions to acquire multiple $\bar{n}$-vectors, which is not possible when the position of the sun is being used as the relative movement of the sun with respect to the heliostat is slow by comparison to that of an aerial vehicle.

Furthermore, the drone can be flown into positions in which the sun does not move during the day, making it possible to define a heliostat tracking model more accurately and with a wider range of calibration points than would be available when using the sun's reflection for calibration.

Since multiple drones can be utilized, and individual drones can be configured to calibrate multiple heliostats, calibration of a field of heliostats can be carried out much more quickly than using BCS. This allows calibration to be performed more often and permits a less expensive and more robust heliostat structure to be employed. When new CSP plants are being erected, the method only needs a target with a known location to be set up initially, and this can be done before the entire tower is erected which can shorten calibration time.

Figure 7:
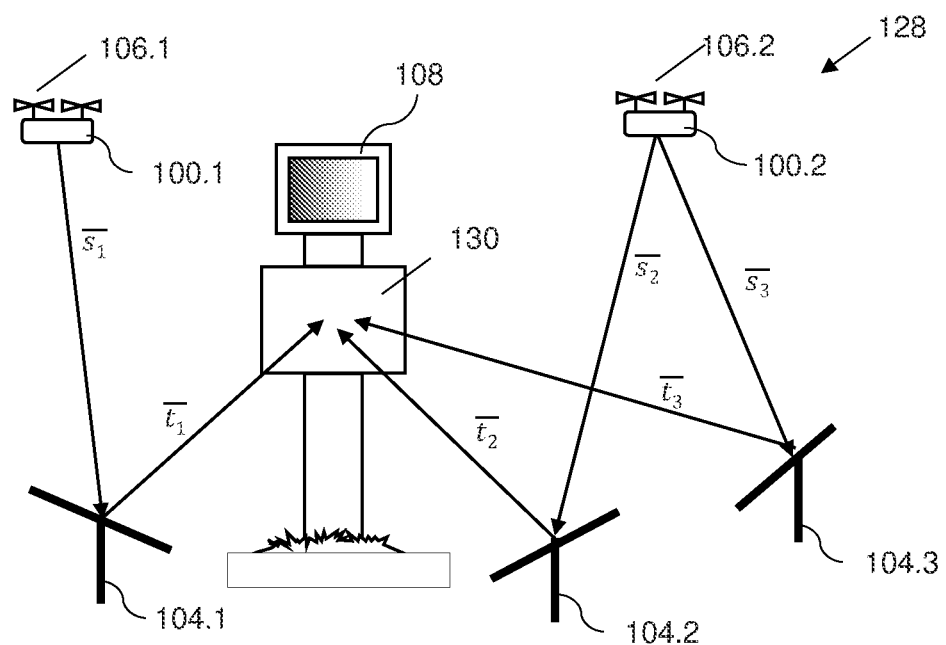
FIG. 7 is a schematic illustration of a second embodiment of a system for calibrating a heliostat according to the present disclosure.
Figure 8:
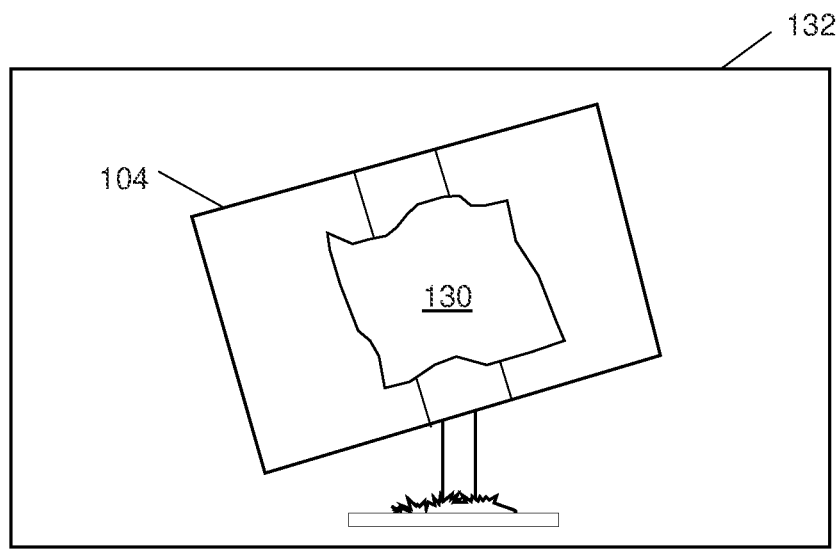
FIG. 8 shows an image captured by an imaging device shown in FIG. 7.

FIG. 7 shows a schematic illustration of a second embodiment of a system (128) for calibrating a heliostat according to the present disclosure. The set-up is similar to the previous embodiment, and like reference numerals refer to like features, but in this embodiment a calibration target (130) is used that is not divided into segments. This may be an existing calibration target (130) on a CSP tower, and may accordingly be simply a white rectangle intended for calibration using the BCS method. FIG. 8 shows an image (132)

taken by the imaging device (100) that shows the heliostat (104) and a reflection of calibration target (130) visible on the heliostat mirror. In this illustration, the entire calibration target (130) is visible within the mirror.

In the case where a single imaging device is used to calibrate multiple heliostats, a wide-angle lens can be used so as to capture multiple heliostats within the single image, or alternatively more than one camera on the drone can be provided with the cameras oriented differently to take multiple images.

Figure 9:
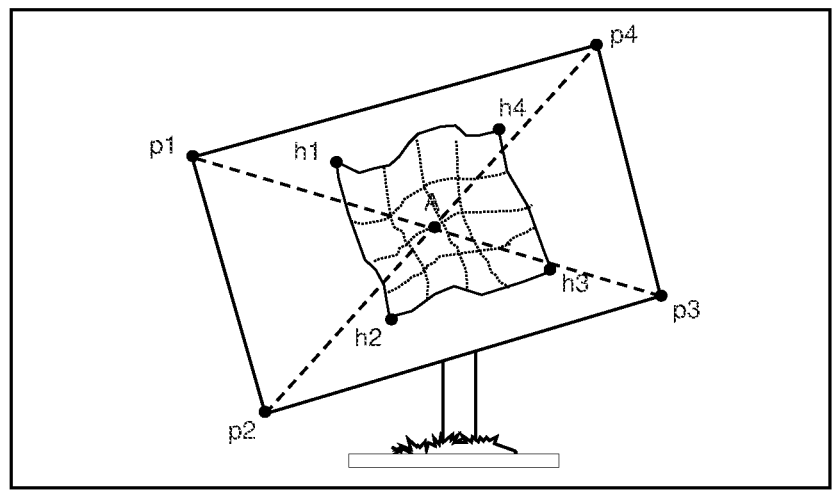
FIG. 9 illustrates steps of determining coordinates within the image of FIG. 8.

With reference to FIG. 9, which is similar to FIG. 8 but shows certain geometric steps, a first step in deriving the $\bar{t}$-vector is to determine, in the captured image, the pixel coordinates of a centre point (A) of the heliostat facet. This can be done by analysing the image to identify the four corner points (p1, p2, p3, p4) of the heliostat image. Since the heliostat is a different colour than the background and is rectangular, image processing software can be used to identify these four corner points (p1, p2, p3, p4). Each corner point is an x-y pixel coordinate of the point on the image. The centre point (A) can then be determined mathematically as the point at which lines connecting the corners of the heliostat intersect. The equations for doing so are as follows:

$$A.x = (p1.x + p2.x + p3.x + p4.x)/4 \quad (4)$$

$$A.y = (p1.y + p2.y + p3.y + p4.y)/4 \quad (5)$$

The next step is to determine, in the captured image, the pixel coordinates of at least one feature (h) of the reflected calibration target. While a single point such as a central marking in the reflected calibration target could work, a higher degree of accuracy is achieved by obtaining multiple features. Where the calibration target is rectangular, the four corner points (h1, h2, h3, h4) of the calibration target can be identified by image processing software. Each corner point (h1, h2, h3, h4) is an x-y pixel coordinate within the image.

Then, using homography, a projective transformation matrix (H) is determined that transforms the four corner points (h1, h2, h3, h4) to actual coordinates of the corresponding corners on the calibration target (i.e. positions on a plane of the calibration target). Matlab™ has a command called "fitgeotrans" which achieves this. In a projective transformation, straight lines remain straight, but parallel lines do not remain parallel. This transformation is suitable because it was found that the images obtained had little to no image distortion due to the camera lens, and the heliostat mirrors themselves are flat. The projective transformation matrix (H) may be represented by the following equation:

$$\begin{pmatrix} \tilde{u} \\ \tilde{v} \\ \tilde{w} \end{pmatrix} = \begin{pmatrix} H_{11} & H_{12} & H_{13} \\ H_{21} & H_{22} & H_{23} \\ H_{31} & H_{32} & 1 \end{pmatrix} \begin{pmatrix} X \\ Y \\ 1 \end{pmatrix} \quad (6)$$

Figure 10:
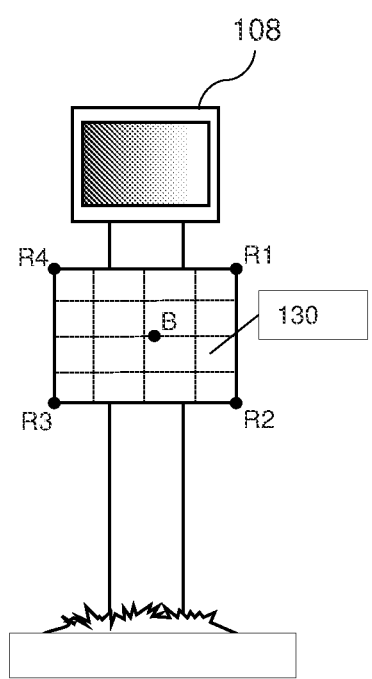
FIG. 10 illustrates determining coordinates on a calibration target.

The projective transformation matrix (H) is then applied to the centre point (A) so as to determine coordinates of a point (B) on the target (130) as seen in FIG. 10 corresponding to the centre point (A) as seen in FIG. 9. If the optical centre of the heliostat is assumed to be point (A), then point (B) will correspond to the centroid position on the calibration target (130).

In one example, the target's centre can be designated coordinates (0, 0). For a target that is 2 m by 2 m in size, the coordinates of the corners are R1=(1,1), R2=(1,−1), R3=(−1,−1) and R4=(−1,1). When point h1 is transformed using the matrix H, the result is (1,1) or the coordinates of R1. When h2 is transformed, the result is (1,−1) or R2. When A is transformed, the result is point B. The three-dimensional coordinates of point B in space can then be determined since the position of the calibration target is known.

FIG. 10 shows the calibration target (130) with point B shown. The grid lines are included in FIGS. 9 and 10 to aid in understanding the relative position of point B. Note that in both the photograph of the heliostat in FIG. 9 and the actual position on the target in FIG. 10, point B is on the central horizontal grid line and slightly towards points h1 and R1 and points h2 and R2.

Once point B is known, the vector $\bar{t}$ is then known as the vector extending between the coordinates of the center position of the heliostat and point B. The $\bar{s}$-vector is the vector that extends between the coordinates of the imaging device and the center position of the heliostat. Since these points are known, the $\bar{s}$-vector is also known. The $\bar{n}$-vector can then be determined according to formula (3) above and used to update parameters of a tracking model of the heliostat according to existing methods.

The embodiment illustrated with reference to FIGS. 7 to 10 has the advantage that an existing, plain white calibration target (130) of a CSP plant may be used. However, it has the drawback that it assumes that the center point (A) corresponds to the optical center of the heliostat which may not always be the case due to mirror distortions. The first embodiment, by using weighted averages of the areas of the segments, does not suffer this drawback as the centroid of reflection within the image is measured (not assumed). Furthermore, the first embodiment does not require that the entire calibration target be visible within the image of the heliostat.

Experimental Results

The feasibility of the method according to the second embodiment was determined experimentally. A heliostat was initially calibrated with the existing BCS calibration method and then held stationary in place (i.e. frozen). From this the actual orientation of the heliostat can be determined using the azimuth and elevation angles of the sun at the time at which the BCS calibration was carried out, or $\bar{s}$-vector, and the actual $\bar{t}$-vector. The actual $\bar{t}$-vector is measured from the centre of the frozen heliostat mirror to the centre of the calibration target, where the reflecting beam hits. The normal of the mirror plane, the $\bar{n}$-vector, is then calculated from this $\bar{s}$-vector and $\bar{t}$-vector using equation (3) above. The orientation of the mirror plane is then determined from this $\bar{n}$-vector.

A drone with RTK-GPS was then flown over this frozen heliostat to capture the reflection of the target with the drone-mounted camera. The $\bar{s}$-vector from the drone and $\bar{t}$-vector to the target were then determined according to the method as set out above to calculate the normal vector of the mirror plane and thus the orientation of the heliostat, and this was compared to the data from the regular DCS calibration. The data is given below, and as can be seen, the average of the 7 measurements taken using the drone closely matched the data obtained from the BCS calibration control, validating the accuracy of the method.

| Measurement number | Azimuth of heliostat (degrees) | Elevation of heliostat (degrees) |
|---|---|---|
| 1 | −3,697 | 28,685 |
| 2 | −3,488 | 26,778 |
| 3 | −3,324 | 25,477 |

-continued

| Measurement number | Azimuth of heliostat (degrees) | Elevation of heliostat (degrees) |
|---|---|---|
| 4 | −4,408 | 26.282 |
| 5 | −4,377 | 26.501 |
| 6 | −3.478 | 26.160 |
| 7 | −2.976 | 25.872 |
| Average of measurements using drone system (n = 20) | −3,6626 | 25,8520 |
| Control | −3.755 | 25.701 |

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Any of the steps, operations, components or processes described herein may be performed or implemented with one or more hardware or software units, alone or in combination with other devices. Components or devices configured or arranged to perform described functions or operations may be so arranged or configured through computer-implemented instructions which implement or carry out the described functions, algorithms, or methods. The computer-implemented instructions may be provided by hardware or software units. In one embodiment, a software unit is implemented with a computer program product comprising a non-transient or non-transitory computer-readable medium containing computer program code, which can be executed by a processor for performing any or all of the steps, operations, or processes described.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A method of calibrating a heliostat, comprising:
    positioning and orienting an imaging device so that a calibration target reflected by the heliostat is visible at the imaging device, the imaging device having a known position and the calibration target including multiple features arranged thereon;
    by means of the imaging device, taking an image of the heliostat that includes the reflected calibration target visible on the heliostat;
    identifying the multiple features of the calibration target in the image;
    using the multiple features to determine a centroid of reflection within the image by determining segments defined by the multiple features and determining a weighted average of areas of the segments shown within the image;
    mapping the centroid of reflection within the image to a corresponding centroid position on the calibration target;
    determining a vector $\bar{t}$ that extends between the centroid position on the calibration target and a known center position of the heliostat;
    determining a vector $\bar{s}$ that extends between the known position of the imaging device and the known center position of the heliostat;
    determining a normal vector $\bar{n}$ of the heliostat as the vector that bisects the $\bar{t}$-vector and the $\bar{s}$-vector; and
    calibrating the heliostat by updating parameters of a tracking model using the determined $\bar{n}$-vector.

2. The method as claimed in claim 1, wherein the segments have a visual coding applied thereto so that a sub-set of segments can be uniquely identified within all of the segments.

3. The method as claimed in claim 2, wherein the visual coding includes colors applied to at least a portion of each segment.

4. The method as claimed in claim 1, wherein only a sub-set of the segments are visible within the image.

5. The method as claimed in claim 1, wherein an area of a segment may be determined based on a number of pixels in the image within the segment.

6. The method as claimed in claim 1, wherein using the multiple features to determine a centroid of reflection within the image and mapping the centroid of reflection within the image to a corresponding centroid position on the calibration target includes:
    determining coordinates of a center point (A) in the image that corresponds to the center position of the heliostat;
    determining coordinates of the identified features (h1, h2, h3, h4) of the reflected calibration target in the image;
    determining a projective transformation matrix (H) that transforms the features (h1, h2, h3, h4) to actual coordinates of corresponding features on the calibration target; and
    applying the projective transformation matrix (H) to the center point (A) so as to determine coordinates of a point (B) on the target corresponding to the center point (A), the point
(B) being designated as the centroid position on the calibration target.

7. The method as claimed in claim 6, wherein the step of determining the coordinates of the center point (A) includes analyzing the image to identify corners (p1, p2, p3, p4) of the heliostat, and calculating the center point (A) as the point at which lines connecting the corners intersect.

8. The method as claimed in claim 6, wherein the identified features (h1, h2, h3, h4) of the reflected calibration target are four corners of the reflected calibration target.

9. The method as claimed in claim 1, wherein the imaging device is mounted on an aerial vehicle.

10. The method as claimed in claim 1, wherein the imaging device is mounted on a pole or pedestal.

11. The method as claimed in claim 1, including an initial step of moving the heliostat into a calibration orientation.

12. The method as claimed in claim 1, wherein the steps of the method are repeated in respect of each image recorded by the imaging device, so as to rapidly obtain multiple $\bar{n}$-vectors for use in updating parameters of the tracking model.

13. The method as claimed in claim 1, wherein the known position of the imaging device is a position relative to the heliostat to which the sun does not move during the day.

14. The method as claimed in claim 1, wherein the imaging device's position is determined by means of a real-time kinematic (RTK) global positioning system (GPS).

15. The method as claimed in claim 1, wherein the imaging device is capable of calibrating more than one heliostat from each known position by taking images of more than one heliostat.

16. The method as claimed in claim 1, wherein the imaging device is moved to successive known positions so as to successively obtain different calibration points.

17. The method as claimed in claim 1, in which more than one imaging device is employed simultaneously over a field of heliostats.

18. A system for calibrating a heliostat, comprising:
an imaging device which is positioned and oriented so that a calibration target reflected by the heliostat is visible at the imaging device, the calibration target including multiple features arranged thereon;
a position detection system to determine the position of the imaging device;
and a processor;
wherein the imaging device takes an image of the heliostat that includes the reflected calibration target visible on the heliostat;
and wherein the processor:
identifies the multiple features of the calibration target in the image;
uses the multiple features to determine a centroid of reflection within the image by determining segments defined by the multiple features and determining a weighted average of areas of the segments shown within the image;
maps the centroid of reflection within the image to a corresponding centroid position on the calibration target;
determines a vector $\bar{t}$ that extends between the centroid position on the calibration target and a known center position of the heliostat;
determines a vector $\bar{s}$ that extends between the known position of the imaging device and the known center position of the heliostat; and
determines a normal vector $\bar{n}$ of the heliostat as the vector that bisects the $\bar{t}$-vector and the $\bar{s}$-vector, the $\bar{n}$ vector usable in calibrating the heliostat by updating parameters of a tracking model of the heliostat.

\* \* \* \* \*